United States Patent
Hijazi et al.

(10) Patent No.: US 10,117,178 B2
(45) Date of Patent: Oct. 30, 2018

(54) SIMULTANEOUS POWER CONTROL AMONG MULTIPLE DEVICES PER CONTEXT

(71) Applicant: Dell Products L.P., Round Rock, TX (US)

(72) Inventors: Mohammed K. Hijazi, Austin, TX (US); Richard W. Schuckle, Austin, TX (US); Joohyun Woo, Austin, TX (US); Tera Siddhartha Reddy, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 244 days.

(21) Appl. No.: 14/946,075

(22) Filed: Nov. 19, 2015

(65) Prior Publication Data
US 2017/0150443 A1    May 25, 2017

(51) Int. Cl.
*H04W 52/02* (2009.01)
*H04W 4/02* (2018.01)
*H04W 4/80* (2018.01)

(52) U.S. Cl.
CPC ....... *H04W 52/0219* (2013.01); *H04W 4/023* (2013.01); *H04W 4/80* (2018.02); *H04W 52/0229* (2013.01)

(58) Field of Classification Search
CPC . H04W 52/0219; H04W 4/008; H04W 4/023; H04W 52/0229
See application file for complete search history.

(56) References Cited

U.S. PATENT DOCUMENTS

| | | | |
|---|---|---|---|
| 8,823,507 B1* | 9/2014 | Touloumtzis | H04L 67/24 340/501 |
| 9,319,856 B1* | 4/2016 | Riggs | H04W 4/12 |
| 2005/0198545 A1* | 9/2005 | Wieck | H04L 51/04 713/323 |
| 2006/0171357 A1* | 8/2006 | King | H04W 72/046 370/331 |
| 2006/0239217 A1* | 10/2006 | Hassan | H04L 63/0492 370/311 |
| 2007/0236719 A1* | 10/2007 | Chandranmenon | A63F 13/12 358/1.14 |

(Continued)

*Primary Examiner* — Tejis Daya
(74) *Attorney, Agent, or Firm* — Terrile, Cannatti, Chambers & Holland, LLP; Stephen A. Terrile

(57) ABSTRACT

A system, method, and computer-readable medium are disclosed for performing a power management operation for a plurality of information handling systems associated with the same user. With the power management operation, a plurality of information handling systems are detected and linked together using a communication network/path to enable power control among the plurality of information handling systems. Additionally, in certain embodiments, the power management operations allow power messages be to communicated among the plurality of information handling system. In various embodiments, a power state of each system is checked and if there is a change in system context or power state in one of the communicating systems, a message is generated and provided to other linked systems. The receiving systems can now change their respective power state based on the message received.

20 Claims, 3 Drawing Sheets

(56) References Cited

U.S. PATENT DOCUMENTS

| | | | | |
|---|---|---|---|---|
| 2010/0008279 A1* | 1/2010 | Jeon | .................. | H04W 52/0229 |
| | | | | 370/311 |
| 2010/0070785 A1* | 3/2010 | Fallin | .................... | G08B 13/248 |
| | | | | 713/320 |
| 2010/0115084 A1* | 5/2010 | Caspi | .................... | G06F 1/3203 |
| | | | | 709/224 |
| 2012/0173908 A1* | 7/2012 | Chakra | ................. | G06F 1/3206 |
| | | | | 713/323 |
| 2012/0214458 A1* | 8/2012 | Levien | .................... | H04W 4/16 |
| | | | | 455/417 |
| 2012/0218919 A1* | 8/2012 | Kesselring | ........ | H04M 3/42272 |
| | | | | 370/259 |
| 2013/0297704 A1* | 11/2013 | Alberth, Jr. | ........... | H04L 67/303 |
| | | | | 709/205 |
| 2013/0297958 A1* | 11/2013 | Siegel | .................... | G06F 1/325 |
| | | | | 713/323 |
| 2014/0265566 A1* | 9/2014 | Nguyen | ................ | H02J 7/0068 |
| | | | | 307/23 |
| 2015/0149566 A1* | 5/2015 | Shmilov | ................ | H04W 4/12 |
| | | | | 709/206 |
| 2015/0323981 A1* | 11/2015 | Yarvis | ................... | G06F 1/3293 |
| | | | | 713/323 |
| 2016/0302237 A1* | 10/2016 | Gupta | ............... | H04W 52/0225 |
| 2017/0055126 A1* | 2/2017 | O'Keeffe | .............. | H04W 4/023 |
| 2017/0055195 A1* | 2/2017 | Ingale | ................... | H04W 36/22 |

* cited by examiner

SIMULTANEOUS POWER CONTROL AMONG MULTIPLE DEVICES PER CONTEXT

BACKGROUND OF THE INVENTION

Field of the Invention

The present invention relates to information handling systems. More specifically, embodiments of the invention relate to power control among multiple devices per context.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many users have more than one portable information handling system, such as a notebook type information handling system, tablet type information handling system, phablet type information handling system, and cell phone type information handling system. Many of these information handling systems include associated power control systems to extend battery usage of the respective system.

SUMMARY OF THE INVENTION

A system, method, and computer-readable medium are disclosed for performing a power management operation for a plurality of information handling systems associated with the same user. With the power management operation, a plurality of information handling systems are detected and linked together using a communication network/path to enable power control among the plurality of information handling systems. Additionally, in certain embodiments, the power management operations allows power messages be to communicated among the plurality of information handling system. In various embodiments, a power state of each system is checked and if there is a change in system context or power state in one of the communicating systems, a message is generated and provided to other linked systems. The receiving systems can now change their respective power state based on the message received. This power management operation manages power consumption of all the connected devices simultaneously and improve the user experience as they transition from system to system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
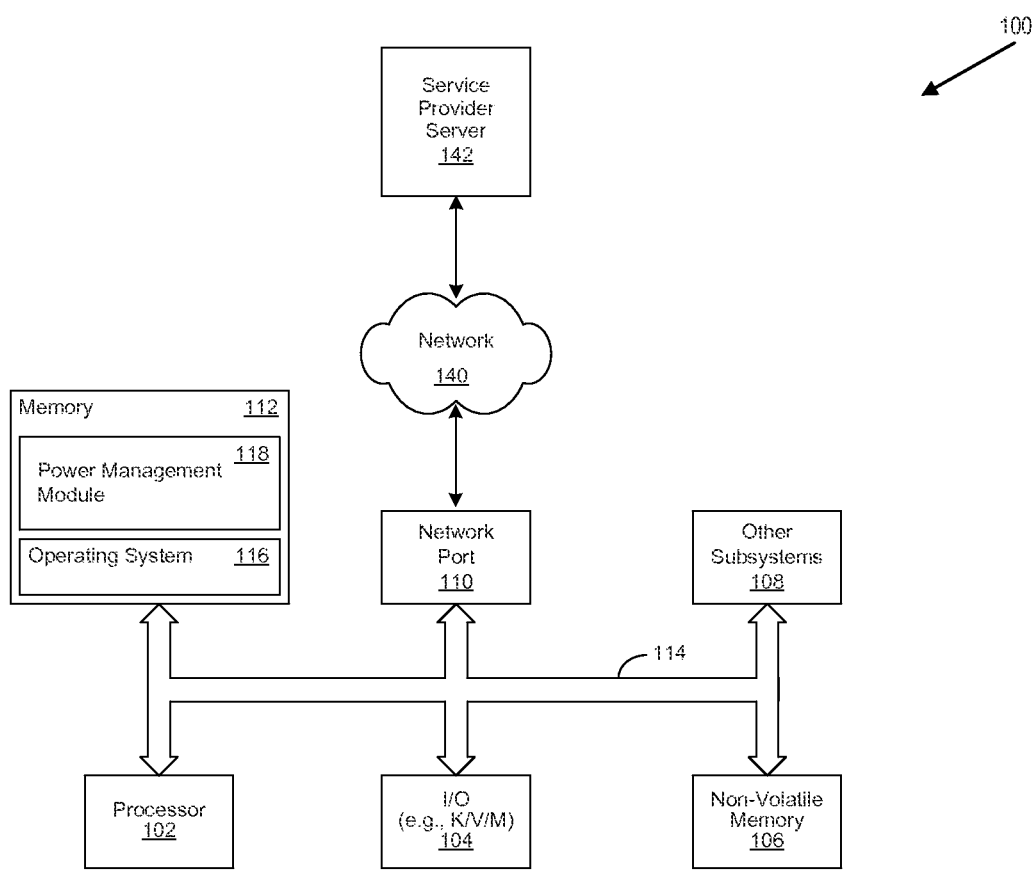
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a power management module 118.

The power management module 118 performs a power management operation for a plurality of information handling systems associated with the same user. With the power management operation, a plurality of information handling systems are detected and linked together using a communication network/path to enable power control among the plurality of information handling systems. Additionally, in certain embodiments, the power management operations allow power messages be to communicated among the plurality of information handling system. In various embodiments, a power state of each system is checked and if there is a change in system context or power state in one of the communicating systems, a message is generated and provided to other linked systems. The receiving systems can now change their respective power state based on the message received. This power management operation manages power consumption of all the connected devices simultaneously and improve the user experience as they transition from system to system.

Figure 2:
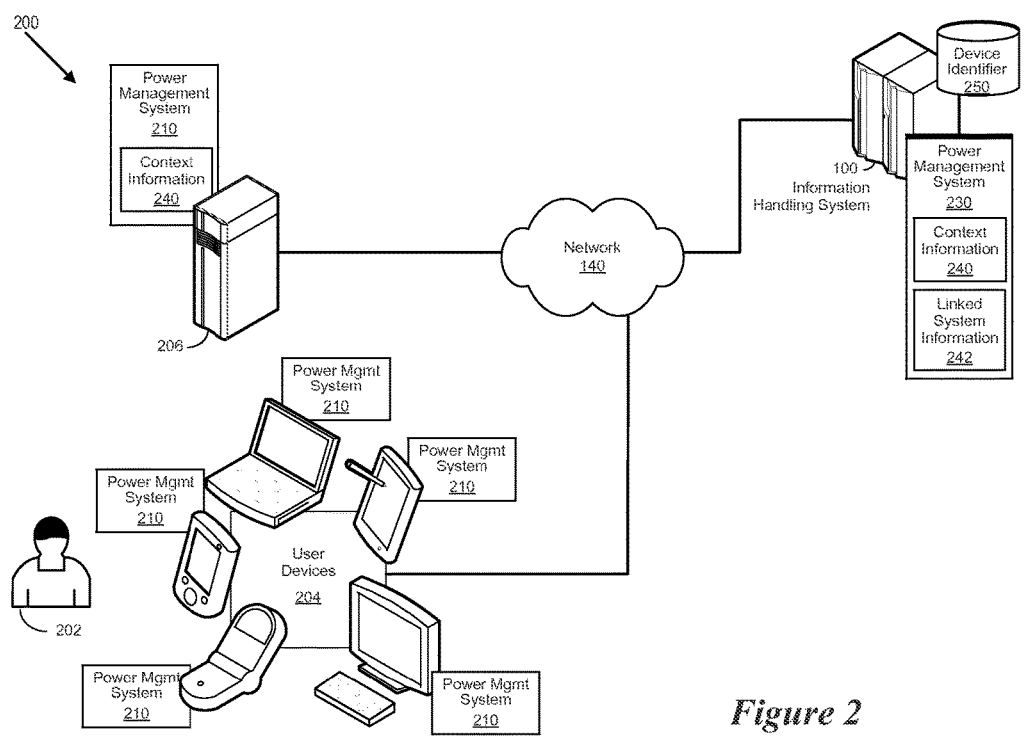
FIG. 2 shows a block diagram of a power management environment.

FIG. 2 is a simplified block diagram of a multi system environment 200 implemented in accordance with an embodiment of the invention. In various embodiments, a user 202 has access to one or more user devices 204 as well as a user associated information handling system 206 some or all on which a power management system 210 is executing. In certain embodiments, the user associated information handling system 206 may be considered another user device 204. In various embodiments, the power management system 210 includes some or all of the functionality of the power management module 118.

As used herein, a user device 204 refers to a device which is associated with the user. In various embodiments, the user device 204 can also include an information handling system such as a personal computer, a laptop computer, a tablet computer, a personal digital assistant (FDA), a smart phone, a mobile telephone, or any other device that is capable of communicating and processing data such as a smart watch type device. In various embodiments a power management operation is performed on at least some of the plurality of user devices 204 associated with the user 202. In various embodiments, wireless technology, such as Bluetooth or Near Field Communication (NFC) type communication technologies are used as the communication method between the devices. Each user device 204 as well as the associated information handling system 206 are linked systems for the purposes of power management operations.

In various embodiments, the user device 204 is used to exchange information between the user 202 and a service provider information handling system 100 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

The power management systems 210 executing on the user devices 204 and information handling system 206 provide the power management environment 200 with a plurality of context based power management options. Additionally, in various embodiments, the power management system 210 for each system may have a unique power management policy when compared with the other linked systems. Additionally, in various embodiments, some or all of the power management system 210 could include a learning component. The learning component provides the power management operation with a learning operation which identifies operational characteristics of at least one of the plurality of information handling systems and changes a power state of the at least one of the plurality of information handling system based upon the operational characteristics. For example, the learning component of the power management system 210 can determine a user's usage trends and modify the power management of the devices accordingly. For example, with a certain user 90% of the time, the user accesses their phone after placing the user's laptop in a sleep mode of operation. Using this collected data over time, the power management system 210 learns that the phone is of higher importance after the user finishes using their laptop. The power management operation can learn how the user uses his devices and create different power modes for better usage of those devices.

Additionally, in certain embodiments, the power management system 210 may apply different policies depending on whether a system is coupled to a power source, e.g., via a docking station, or is operating without being coupled to a power source. Also, in certain embodiments, each power management system 210 could include a context awareness component. In various embodiments, the context awareness component could include a location services module.

For example, in an environment 200 in which a user 202 as an associated laptop type information handling system, tablet type information handling system and smart phone type information handling system in close proximity (e.g., on a table or desk) and is currently using the laptop type information handling system (i.e., is directly interacting with the laptop type information handling system). The user then receives a call on the smart phone and leaves the proximity of the laptop type information handling system and tablet type information handling system (e.g., by walking away from the desk while on the smart phone leaving the laptop type information handling system and tablet type information handling system behind). The power management system 210 executing on the smart phone detects that the user is leaving the proximity of the other systems and sends message to other nearby systems stating this. The other two systems can now go to a lower power state as there is less likelihood of user accessing from a distant. After receiving the message, the power management system for each linked system decides whether to lower the power state for that system. For example, if a linked system is in active mode (e.g., executing a simulation on the background), that system might decide not to change power state.

As another example, in an environment 200 in which a user 202 is currently using a laptop type information handling system and the tablet type information handling system and a smart phone type information handling system are executing in a low power state mode of operation. As the user powers down (i.e., switches off) the laptop type information handling system, the power management system 210 executing on the laptop type information handling system generates a message that is transmitted to the phone type information handling system and the tablet type information handling system indicating that the laptop type information handling system is powering down. The phone type information handling system and the tablet type information handling system would now transition to a higher power state expecting the user to use one or both of these systems. If the user uses the phone type information handling system, the phone type information handling system generates a message that is transmitted to the tablet type information handling system which could indicate that the tablet type information handling system is not going to be used and thus the tablet type information handling system could transition to a lower power state. Alternately, if the user uses the tablet type information handling system, the tablet type information handling system generates a message that is transmitted to the phone type information handling system which could indicate that the phone type information handling system is not going to be used and thus the phone type information handling system could transition to a lower power state.

Examples of change in system context includes, but are not limited to, system to system proximity, system to user proximity, specific date and/or time, and duration of system idle time.

Also, in certain embodiments, the environment 200 further includes a higher level power management system 230. The higher level power management system 230 interacts with a plurality of user information handling systems 206 and a plurality of user devices 204. The higher level power management system 230 enables system administrators to have a view of the power management activities of information handling systems for which they are responsible. In certain embodiments, the higher level power management system 230 enables remote storage and management of power management data and policies for a plurality of user information handling systems. In certain embodiments, the higher level power management system 230 includes system wide context information 240 as well as system wide linked system information 242.

Figure 3:
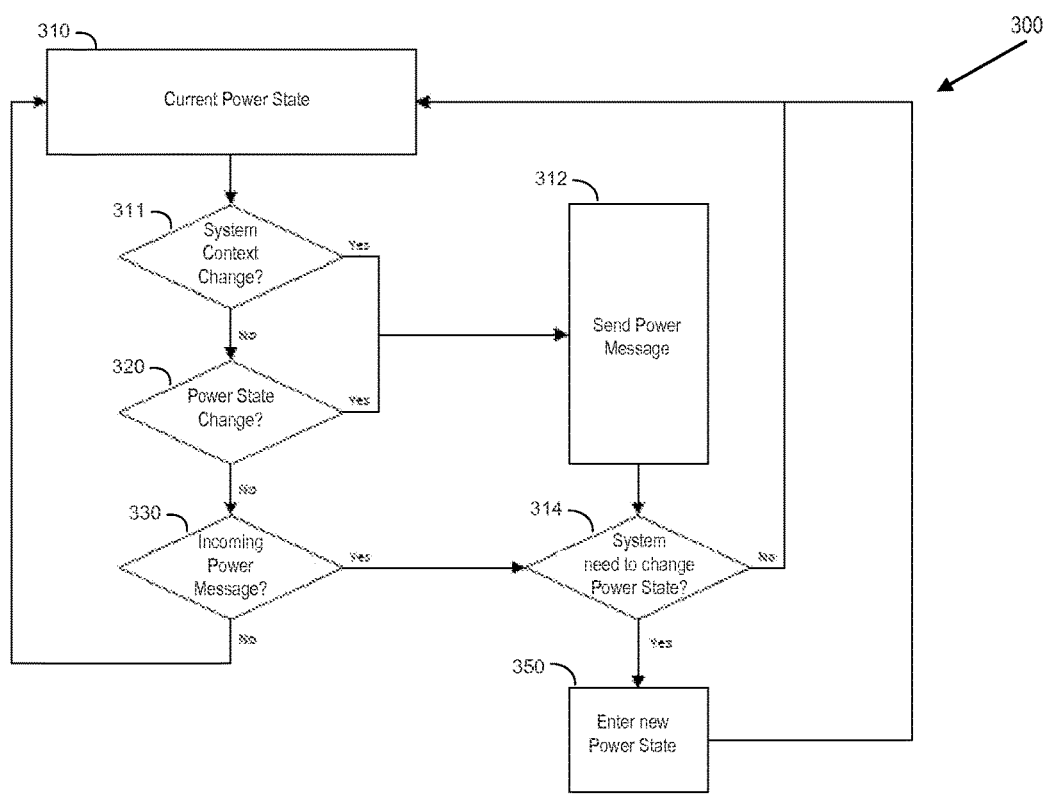
FIG. 3 shows a flow chart of a power management operation.

Referring to FIG. 3, a flow chart of a power management operation 300 is shown. More specifically, the power management operation 300 begins operation at step 310 with the power management system 210 determining a current power state of a system on which the power management system 210 is executing. Next, at step 311, the power management system determines whether a system context change has occurred. For the purposes of this disclosure, a system context change may be defined as a change in operating conditions of any linked system including the system executing the power management system 210. Examples of changes in operating conditions include a linked system being moved to proximity of the system executing the power management system 210, a linked system being removed from proximity of the system executing the power management system 210, and/or an operating status change in a linked system. If a change in operating conditions is detected, then the power management system 210 generates a power message at step 312 and determines whether the system should change its power state at step 314. If not, then the power management operation proceeds to step 320.

At step 320, the power management system 210 determines whether a power state change has occurred to the system executing the power management system 210. A power state change includes one or more of a change from an inactive (e.g., low) power state to an active power state, a change from an active power state to an inactive power state, a system being powered on and a system being powered off. If a change in power state has occurred, then the power management system 210 generates a power message at step 312 and determines whether the system should change its power state at step 314. If not, then the power management operation proceeds to step 330.

At step 330, the power management system 210 determines whether a power message has been received by the system executing the power management system 210. The power message is generated by another linked system and provides information regarding a power related status of the linked system generating the power message. If a power message is not received, then the power management operation 300 returns to step 310. If a power message is received, then the power management operation 300 proceeds to step 314.

At step 314, the power management system 210 determines whether the system executing the power management system 210 should change its power state. This change in power state may be based upon the information contained within the incoming power message detected at step 330 or the information contained within the power message generated at step 312. If the system executing the power management system 210 does not need to change its power state, then the power management operation 300 returns to step 310. If the system executing the power management system 210 does need to change its power state, then the power management operation 300 proceeds to step 350 where the power management system 210 changes the power state of the system executing the power management system 210 and then the power management operation 300 returns to step 310.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the power management system 210 could also include additional context aware or power aware functionality. For example, if the power management system 210 determines that a particular linked system is running low on power, the power management system 210 could initiate a document transfer operation where any documents on which the particular linked system is working could be automatically transferred to another linked system.

Consequently, the invention is intended to be limited only by the spirit and scope of the appended claims, giving full cognizance to equivalents in all respects.

What is claimed is:

1. A computer-implementable method for performing an authentication operation, comprising:
   detecting whether a plurality of information handling systems are in proximity with a user;
   linking the plurality of information handling systems with the user;
   determining when a change of context occurs to an information handling system of the plurality of information handling systems, the change of context comprising a change of system to system proximity of the plurality of information handling systems;
   generating a message from the information handling system when the change of context occurs to the information handling system, the message being provided to a linked information handling system; and,
   performing a power management operation on the linked information handling system in response to the message from the information handling system, the power management operation being based upon the change of context of the information handling system.

2. The method of claim 1, wherein:
the linking is performed based upon a short range communication technology.

3. The method of claim 1, wherein:
the power management operation comprises generating a power message by one of the plurality of information handling systems; and,
the power message is provided to other of the plurality of information handling systems.

4. The method of claim 1, wherein:
the power management operation comprises checking a system context of each of the plurality of information handling systems; and,
if there is a change in system context in one of the linked information handling systems, a message is generated and provided to other linked information handling systems.

5. The method of claim 1, wherein:
the power management operation comprises checking a power state of each of the plurality of information handling systems; and,
if there is a change in power state in one of the information handling systems, a message is generated and provided to other linked systems.

6. The method of claim 1, wherein:
the power management operation further comprises a learning operation, the learning operation identifying operational characteristics of at least one of the plurality of information handling systems and changing a power state of the at least one of the plurality of information handling system based upon the operational characteristics.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
   detecting whether a plurality of information handling systems are in proximity with a user;
   linking the plurality of information handling systems with the user;
   determining when a change of context occurs to an information handling system of the plurality of information handling systems, the change of context comprising a change of system to system proximity of the plurality of information handling systems;
   receiving a message from an information handling system when a change of context occurs to the information handling system, the change of context comprising a change of system to system proximity of the plurality of information handling systems, the message being provided to the system, the system comprising a linked information handling system; and,
   performing a power management operation on the linked information handling system in response to the message from the information handling system, the power management operation being based upon the change of context of the information handling system.

8. The system of claim 7, wherein:
the linking is performed based upon a short range communication technology.

9. The system of claim 7, wherein:
a power management system of one of the plurality of information handling systems generates the power message; and,
the power message is provided to other of the plurality of information handling systems.

10. The system of claim 7, wherein:
the power management operation comprises checking a system context of each of the plurality of information handling systems; and,
if there is a change in system context in one of the linked information handling systems, a message is generated and provided to other linked information handling systems.

11. The system of claim 7, wherein:
a power management system of one of the plurality of information handling systems generates the power message; and,
if there is a change in power state in one of the information handling systems, a message is generated and provided to other linked systems.

12. The system of claim 7, wherein:
the power management operation further comprises a learning operation, the learning operation identifying operational characteristics of at least one of the plurality of information handling systems and changing a power state of the at least one of the plurality of information handling system based upon the operational characteristics.

13. A non-transitory, computer-readable storage medium embodying computer program code, the computer program code comprising computer executable instructions configured for:
detecting whether a plurality of information handling systems are in proximity with a user;
linking the plurality of information handling systems with the user;
determining when a change of context occurs to an information handling system of the plurality of information handling systems, the change of context comprising a change of system to system proximity of the plurality of information handling systems;
generating a message from the information handling system when the change of context occurs to the information handling system, the message being provided to a linked information handling system; and,
performing a power management operation on the linked information handling system in response to the message from the information handling system, the power management operation being based upon the change of context of the information handling system.

14. The non-transitory, computer-readable storage medium of claim 13, wherein:
the linking is performed based upon a short range communication technology.

15. The non-transitory, computer-readable storage medium of claim 13, wherein:
a power management system of one of the plurality of information handling systems generates the power message; and,
the power message is provided to other of the plurality of information handling systems.

16. The non-transitory, computer-readable storage medium of claim 13, wherein:
the power management operation comprises checking a system context of each of the plurality of information handling systems; and,
if there is a change in system context in one of the linked information handling systems, a message is generated and provided to other linked information handling systems.

17. The non-transitory, computer-readable storage medium of claim 13, wherein:
the power management operation comprises checking a power state of each of the plurality of information handling systems; and,
if there is a change in power state in one of the information handling systems, a message is generated and provided to other linked systems.

18. The non-transitory, computer-readable storage medium of claim 13, wherein:
the power management operation further comprises a learning operation, the learning operation identifying operational characteristics of at least one of the plurality of information handling systems and changing a power state of the at least one of the lurality of information handling system based upon the operational characteristics.

19. A computer-implementable method for performing an authentication operation, comprising:
detecting whether three information handling systems are in proximity with a user, the three information handling systems comprising a first information handling system, a second information handling system and a third information handling system;
linking the three information handling systems with the user;
determining when a change of context occurs to the first information handling system, the change of context comprising a change of system to system proximity of the three information handling systems;
generating a message from the first information handling system to the second information handling system and third information handling system when a change of context occurs to the first information handling system; and,
performing a power management operation on the second information handling system and the third information handling system in response to the message from the first information handling system, the power management operation being based upon the change of context of the first information handling system.

20. The method of claim 19, further comprising:
determining whether the user then uses one of the first information handling system and the second information handling system;
generating a message from the second information handling system to the third information handling system when the user uses the second information handling system; and,
performing a power management operation on the third information handling system in response to the message from the second information handling system, the power management operation transitioning the third information handling system to a lower power state.

* * * * *

UNITED STATES PATENT AND TRADEMARK OFFICE
CERTIFICATE OF CORRECTION

PATENT NO. : 10,117,178 B2
APPLICATION NO. : 14/946075
DATED : October 30, 2018
INVENTOR(S) : Mohammed K. Hijazi et al.

Page 1 of 1

It is certified that error appears in the above-identified patent and that said Letters Patent is hereby corrected as shown below:

In the Claims

Column 10, Line 19, Claim 18 the term "lurality" should be replaced with -- plurality --

Signed and Sealed this
Eighth Day of January, 2019

Andrei Iancu
*Director of the United States Patent and Trademark Office*